(12) United States Patent
Dwelley et al.

(10) Patent No.: US 11,006,774 B2
(45) Date of Patent: May 18, 2021

(54) SLIDABLE MAILBOX BRACKET

(71) Applicant: ISND DESIGN LLC, Hampton Falls, NH (US)

(72) Inventors: Neal Robert Dwelley, Haverhill, MA (US); Ivan Stanek, Hampton Falls, NH (US)

(73) Assignee: ISND DESIGN LLC, Hampton Falls, NH (US)

( * ) Notice: Subject to any disclaimer, the term of this patent is extended or adjusted under 35 U.S.C. 154(b) by 49 days.

(21) Appl. No.: 16/546,995

(22) Filed: Aug. 21, 2019

(65) Prior Publication Data

US 2020/0060459 A1 Feb. 27, 2020

Related U.S. Application Data

(60) Provisional application No. 62/728,986, filed on Sep. 10, 2018, provisional application No. 62/721,666, filed on Aug. 23, 2018.

(51) Int. Cl.
*A47G 29/12* (2006.01)
*F16M 13/02* (2006.01)

(52) U.S. Cl.
CPC ....... *A47G 29/1216* (2013.01); *F16M 13/022* (2013.01)

(58) Field of Classification Search
CPC .......... A47G 29/1216; A47G 29/12097; A47G 29/122; F16M 13/022
USPC .......... 232/29, 33, 38, 39; 248/298.1, 219.2, 248/146
See application file for complete search history.

(56) References Cited

U.S. PATENT DOCUMENTS

| 2,723,098 | A | | 11/1955 | Moore |
| 3,163,356 | A | | 12/1964 | Joehnk |
| 6,161,756 | A | * | 12/2000 | Upton ................ A47G 29/1216 232/39 |
| 6,543,680 | B1 | * | 4/2003 | McCormack ...... A47G 29/1216 232/39 |
| 7,163,141 | B1 | * | 1/2007 | Parker ................ A47G 29/1216 232/39 |
| 7,389,911 | B2 | * | 6/2008 | Ruocco .............. A47G 29/1216 232/39 |
| 7,448,531 | B1 | * | 11/2008 | Bolles ................ A47G 29/1216 232/39 |
| 8,789,803 | B2 | * | 7/2014 | Van Wingerden .......................... A47G 29/1216 248/244 |

(Continued)

*Primary Examiner* — William L Miller
(74) *Attorney, Agent, or Firm* — Finch & Maloney, PLLC; Michael J. Bujold (57) ABSTRACT

A mailbox mounting bracket for a mailbox. The mailbox mounting bracket comprises a lower first member and an upper second member. The lower first member has a T-shaped transverse cross sectional profile and the upper second member defines a mating T-shaped recess. The T-shaped recess of the upper second member captively receives and encloses the T-shaped transverse cross sectional profile of the lower first member such that three sides of the lower first member are completely surrounded by the upper second member while a fourth side of the lower first member is only partially surrounded by lower legs of the upper second member and is at least partially exposed so as to facilitate attachment of the lower first member to a surface of a mailbox post. The upper second member is slidably moveable relative to the lower first member.

18 Claims, 9 Drawing Sheets

(56) References Cited

U.S. PATENT DOCUMENTS

2006/0022028 A1\* 2/2006 Thomas ........... A47G 29/12097
232/29

\* cited by examiner

SLIDABLE MAILBOX BRACKET

FIELD OF THE INVENTION

The present invention relates to a mailbox mounting bracket, which facilitates mounting of a mailbox to a mailbox post, and the mailbox mounting bracket has both a normal retracted position as well as an extended position which facilitates both delivery and retrieval of mail from the mailbox mounted via the mailbox bracket.

BACKGROUND OF THE INVENTION

Many mailboxes are located in places along the road that are difficult to access. This frequently makes delivering the mail and retrieving mail challenging. A number of mailboxes are positioned far from the road, which makes it harder for a postal worker to deliver the mail. Often times, people try to retrieve their mail from an automobile and frequently need to get out of their vehicle or lean out the window in order to access fully their mailbox. People in wheelchairs also have challenges in retrieving their mail due to obstacles, such as curbs, located in front of the mailbox. In addition, during the winter, many people do not properly clear or remove heavy snow adjacent their mailboxes and this hinders mail delivery services as well as retrieval of the mail by the customer. Lastly, many people have inferior/failing mailbox mounting brackets, for mounting their mailboxes to mailbox posts, that cannot reliably withstand the elements associated with winter.

SUMMARY OF THE INVENTION

Wherefore, it is an object of the present invention to overcome the above mentioned shortcomings and drawbacks associated with the prior art mounting arrangement for mailboxes.

It is an object of the disclosure is to allow easy retrieval of mail from a mailbox attached to a mailbox post which is designed to operate properly in all types of weather and conditions.

An object of the disclosure is to provide a two-component mailbox mounting bracket arrangement, which may comprises up to six separate pieces, that is designed to facilitate quick and easy attachment to a mailbox post. Thereafter, a conventional mailbox can then be quickly and easily attached to the upper second member of the two-component mailbox mounting bracket arrangement to mount the mailbox thereto.

Still another object of the disclosure is to provide a two-component mailbox mounting bracket arrangement which permits the upper second member, supporting the mailbox, to move or slide along with the mailbox, relative to the lower first member, being supported by the mailbox post, so that the mailbox may be extended, relative to the mailbox post, by a distance of up to 13½ inches or so to assist with easier delivery of the mail, by a postal worker, and well as easier retrieval of the mail, by a mail recipient located within a vehicle, on foot, on a wheelchair, etc.

Yet another object of the disclosure is to facilitate easy adjustment of the amount of sliding tension or resistance, provided between the upper second member and the lower first member, so as to suit the desire or preference of the end user.

A further object of the disclosure is to provide a two-component mailbox mounting bracket arrangement which operates properly in all types of weather and conditions, including snow and ice, without freezing or malfunctioning. The two-component mailbox mounting bracket arrangement includes a lateral channel design which minimizes the effects of ice and snow on the mailbox bracket, which could otherwise obstruct or hinder the moving or sliding motion of the upper second member relative to the lower first member.

A still further object of the disclosure is to provide a two-component mailbox mounting bracket arrangement which is designed to avoid deterioration, cracking, warping, etc., of the mounting bracket arrangement and thereby providing a solid platform on which to mount a mailbox.

The disclosure also relates to a mailbox mounting bracket for a mailbox, the mailbox mounting bracket comprising: a lower first member; a n upper second member; the lower first member having a T-shaped transverse cross sectional profile; the upper second member defining a mating T-shaped recess; the T-shaped recess of the upper second member captively receiving and enclosing the T-shaped transverse cross sectional profile of the lower first member such that three sides of the lower first member are completely surrounded by the upper second member while a fourth side of the lower first member is only partially surrounded by lower legs of the upper second member and is at least partially exposed so as to facilitate attachment of the lower first member to a surface of a mailbox post; and the upper second member being slidably moveable relative to the lower first member.

The disclosure also relates to a method of attaching a mailbox to a mailbox post by using a mailbox mounting bracket, the method comprising: providing a lower first member; providing an upper second member; shaping the lower first member to have a T-shaped transverse cross sectional profile; defining a mating T-shaped recess in the upper second member; captively receiving and enclosing the T-shaped transverse cross sectional profile of the lower first member in the T-shaped recess of the upper second member such that three sides of the lower first member are completely surrounded by the upper second member while a fourth side of the lower first member is only partially surrounded by lower legs of the upper second member and is at least partially exposed so as to facilitate attachment of the lower first member to a surface of a mailbox post; and providing sufficient clearance such that the upper second member being slidably moveable relative to the lower first member.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

As noted above, retrieving mail from a roadside mailbox can be a challenge for people living on busy roads or during inclement weather conditions. Many mailboxes are out of reach for postal delivery workers and homeowners during delivery and/or retrieval of the mail. Accordingly, people typically need to get out of their vehicle or extend a portion of his/her body out the window in order to deliver or retrieve the mail. Moreover, winter conditions present additional problems due to snowplows packing hard to remove snow around mailboxes located along roads.

Mailboxes mounted via inferior brackets can easily fail or malfunction due to the weight/force of snow from plows hitting the mailbox thus removing/dislodging the mailbox from the post. The mailbox mounting bracket, according to the disclosure, assists a homeowner with snow removal after snowstorms. That is, homeowner only needs to remove the snow up to about 12 inches away from mailbox since the mailbox mounting bracket, according to the disclosure, will permit the mailbox to slide outward and extend up to 12-13 additional inches relative to the snow bank.

Individuals with physical limitations can have challenges retrieving his/her own mail. Tiny obstructions such as brush, tall grass and curbs can hinder people from accessing mail. A person in a wheelchair blocked by a curb can reach out and pull his/her mailbox to the person thus allowing independence in retrieving his/her mail. A primary object of the disclosure is to design a mailbox mounting bracket which fulfills the above needs and more, e.g., allows the mailbox to extend or slide outward by 12-13 inches or so to aid in easy delivery and/or retrieval of the mail.

The mailbox mounting bracket, according to the disclosure, has a lateral track design which minimizes the effects of snow and ice on proper operation of the mailbox mounting bracket. The stopping screws are designed to break/cut through ice and snow and allow for smooth sliding, even during the winter months.

The mailbox mounting bracket, according to the disclosure, is designed to slide and extend in one direction while sliding in the opposite direction can assist with disassembling the mailbox mounting bracket into two separate components.

The mailbox mounting bracket is designed not to warp or break, when frozen, as well as operate properly when exposed to extremely high temperatures.

Screws on the lateral L-Shape runners, rails or members are designed to adjust slider tension, e.g., rotating the screws to the right increases the tension while rotating the screws to the left decreases the tension.

This invention fits mailboxes designed for a standard 6 foot 5 inch mailbox mounting bracket.

This invention includes slide rail adapters for oversized mailboxes.

Figure 1:
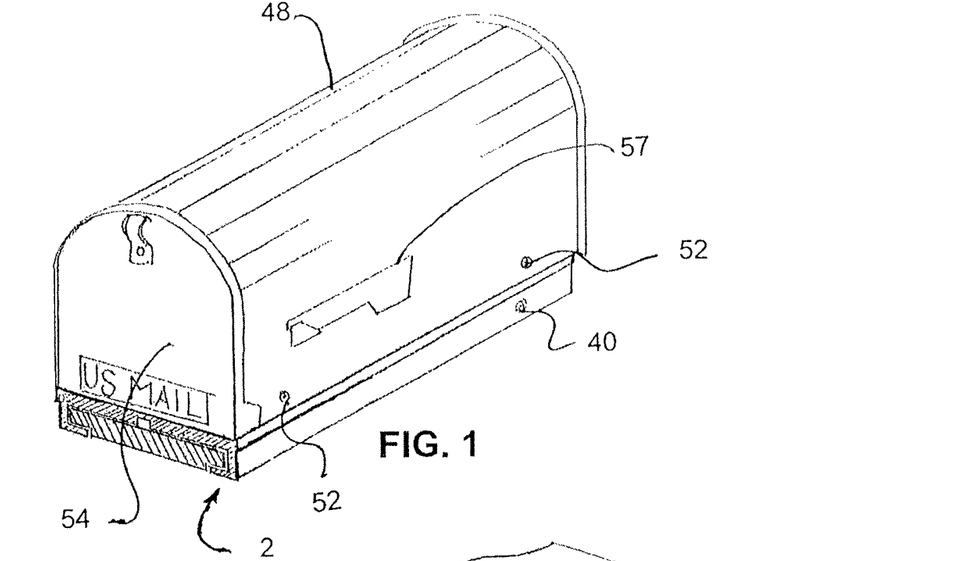
FIG. 1 is a diagrammatic perspective view of a conventional mailbox mounted to the mailbox mounting bracket according to the disclosure.
Figure 2:
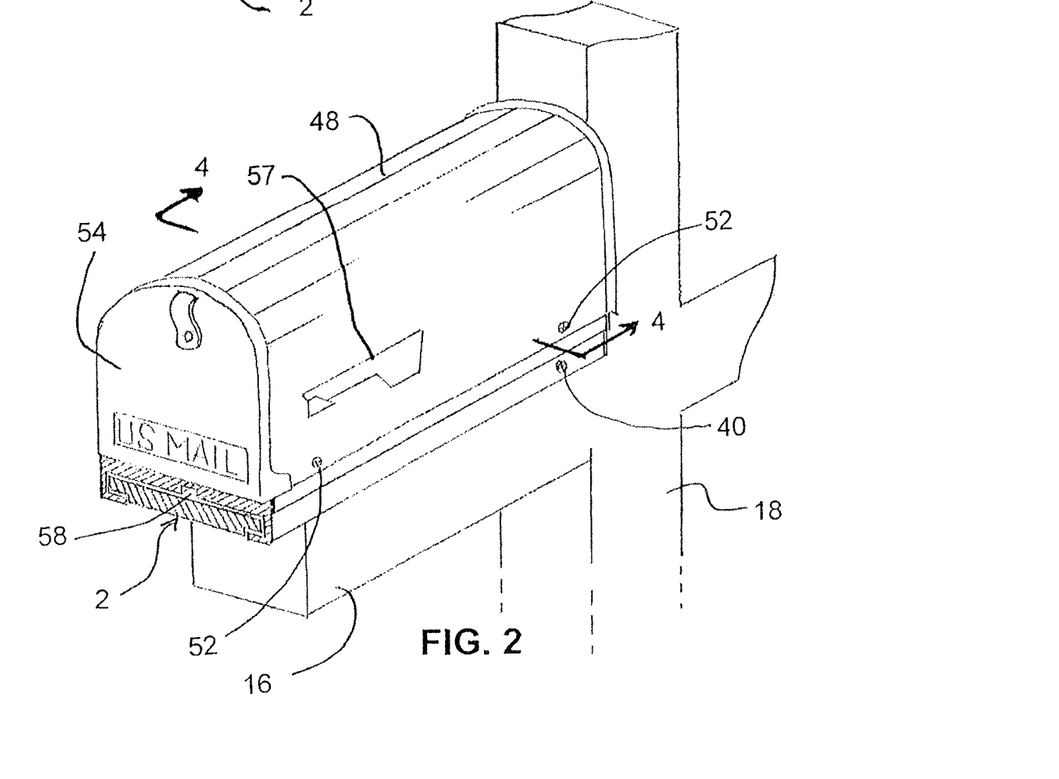
FIG. 2 is a diagrammatic perspective view showing use of the mailbox mounting bracket, according to the disclosure, attaching the mailbox to a horizontal arm of a mailbox post.
Figure 3:
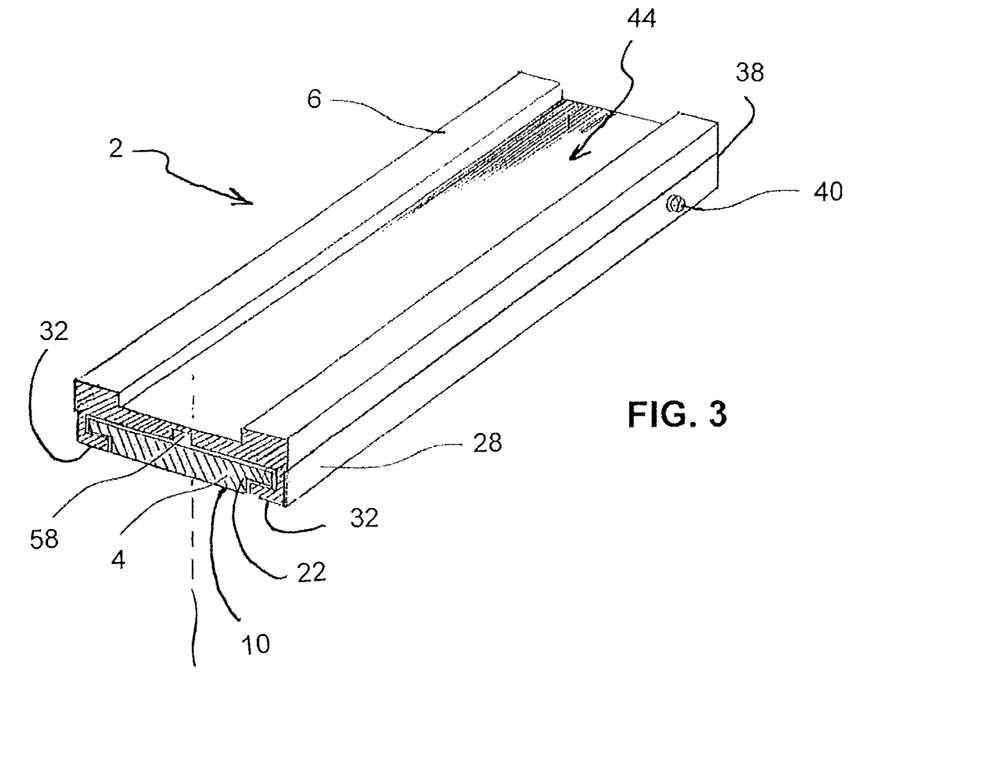
FIG. 3 is a diagrammatic perspective view showing the first and the second brackets of the mailbox mounting bracket assembled with one another, prior to attachment of the mailbox to the upper second member, with the mailbox bracket shown in its normal stowed contracted position.
Figure 4:
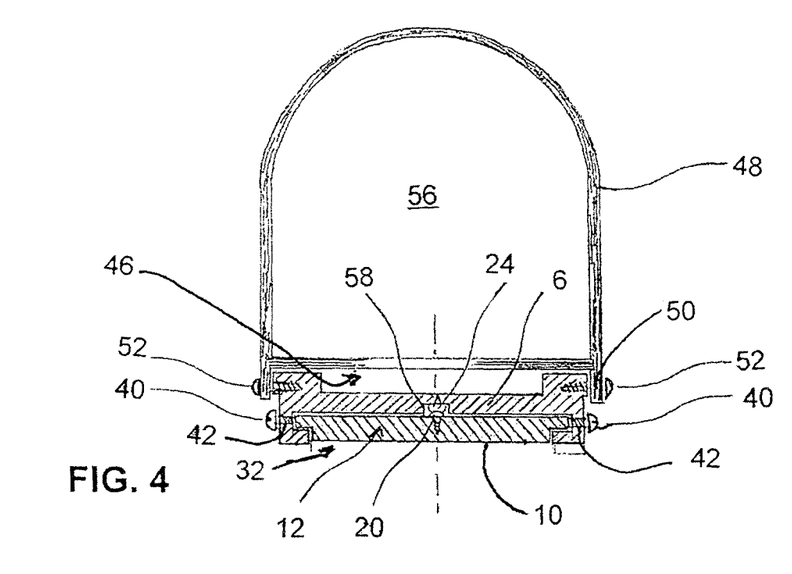
FIG. 4 is a diagrammatic cross sectional view showing the mailbox shown mounted to the mailbox mounting bracket along section line 4-4 of FIG. 1, prior to the lower first member being mounted to the horizontal arm of the mailbox post.
Figure 5:
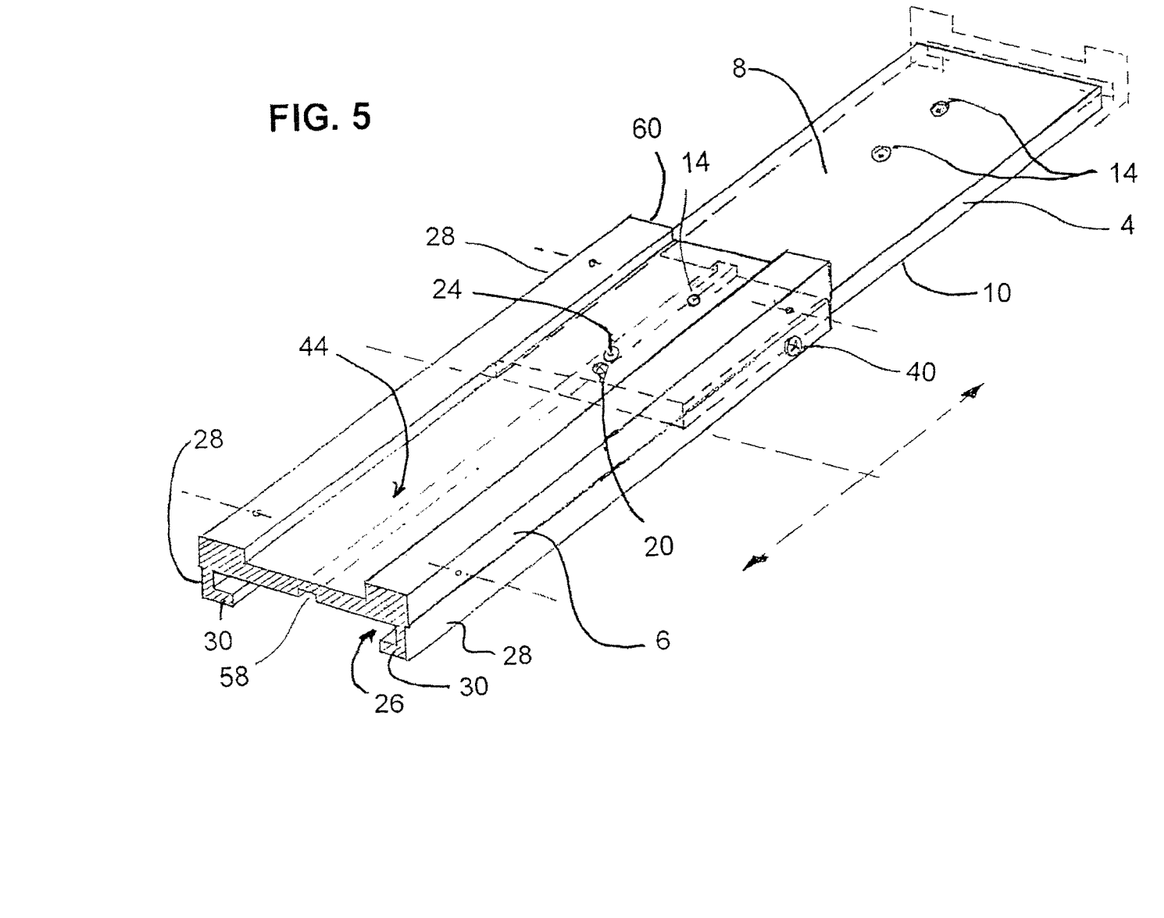
FIG. 5 is a diagrammatic perspective view showing the first and the second brackets, of the mailbox mounting bracket, assembled with one another, prior to attachment of the mailbox to the upper second member, with the mailbox bracket shown in its extended position which facilitates delivery and retrieval of mail.

Turning now to FIGS. 1-6, a detail description concerning a first embodiment of the mailbox mounting bracket 2, according to the disclosure, will be provided. As generally shown in FIGS. 3 and 5, the mailbox mounting bracket 2, according to the disclosure, comprises both a lower first member 4 and an upper second member 6. The lower first member 4 is generally a planar member which has generally flat top surface 8 and a bottom surface 10. The lower first member 4 may be manufactured from wood, plastic, metal, etc. The lower first member 4 typically has a T-shaped transverse cross sectional profile 12 (see FIG. 4). The lower first member 4 typically has a length of between about 12 to 24 inches or so preferably about 16 inches or so, a maximum width of between about 4 to 9 inches or so preferably about 5½ inches or so and a height of about ½ to 1½ inches or so preferably about ¾ of an inch or so. One or more mounting holes 14 (typically a plurality of mounting holes, such as three space apart mounting holes 14) are formed in the lower first member 4. The one or more mounting holes 14 are utilized for attaching the lower first member 4 to a horizontal arm 16 of a mailbox post 18, in a conventional manner. The mounting holes 14 are typically located and extend along a central axis of the lower first member 4 and are located so as to overlie and facilitate attachment of the lower first member 4 to the horizontal arm 16 of the mailbox post 18 (see FIG. 2). Alternatively, one or more of the mounting holes 14 of the lower first member 4 may extend normal to the central axis of the lower first member 4 to facilitate attachment to a (metal) bracket (not shown) of the mailbox post 18 in order to secure the lower first member 4 thereto.

A first stop member 20, e.g., such as a screw, for example, or some other abutment component or member, is secured to the top surface 8 of the lower first member 4, typically closely adjacent, e.g., ⅛ of an inch or so, from a second end 22 of lower first member 4. This first stop member 20, when it abuts against a mating stop member 24 provided on the upper second member 6 (see FIG. 5 and discussed below in further detail) prevents further relative sliding movement between the upper second member 6 and the lower first member 4. A further discussion concerning the purpose of this stop feature, i.e., the first and the mating stop members 20, 24, will become apparent from the following description.

A lower portion of the upper second member 6 defines a T-shaped recess 26 (see FIG. 5) which extends the entire length of the upper second member 6 and is shaped and sized so as to closely and intimately receive and accommodate the T-shaped cross sectional profile 12 of the lower first member 4 therein while, at the same time, still permitting the upper second member 6 to slide/move relative to the secured lower first member 4. The upper second member 6 may also be manufactured from wood, plastic, metal, etc.

A lower portion of both opposed side walls of the upper second member 6, which assist with defining the T-shaped recess 26, are generally L shaped 28. The lower legs 30 of the generally L-shaped sidewalls 28 face toward, but are spaced apart from, one another thereby defining an opening 32 to the mating T-shaped recess 26 which receives and accommodates a bottom portion of the T-shaped cross sectional profile 12 of the lower first member 4. Typically, the bottom surface 34 of each of the lower legs 30 of the generally L-shaped sidewalls 28 are flush with or extend parallel to one another as well as the bottom surface 10 of the T-shaped cross sectional profile 12 of the lower first member 4, e.g., the bottom surface 32 of the lower legs 30 and the bottom surface 10 of the T-shaped cross sectional profile 12 typically all lie in a common plane with one another, although this is not absolutely critical.

The upper second member 6 typically has a length of between about 12 to 24 inches or so preferably about 16 inches or so, a width of between about 4 to 9 inches or so preferably about 6¼ inches or so, and a height of between about ½ to 3 inches or so preferably about 2⅛ inches or so. The dimensions of a widest top section of the T-shaped recess 26 typically has a width of about 5½ inches or so and a height of about ½ of an inch or so while the dimensions of a narrowest bottom section of the T-shaped recess 26 typically has a width of about 3⅝ inches or so and a height of about 1/16 of an inch. The spacing of the free end of the lower legs 30 from the lower first member 4 are designed so as to accommodate the lower portion of the T-shaped lower first member 4 therebetween with play, e.g., about 1/16 to ¼ or so of play between the free end of each lower leg 30 and the lower portion of the T-shaped lower first member 4.

During assembly, the T-shaped cross sectional profile 12 of the lower first member 4 is captively received and enclosed within the T-shaped recess 26 of the upper second member 6 such that three sides of the lower first member 4 are completely surrounded by the upper second member 6 while the fourth (bottom) side of the lower first member 4 is only partially surrounded by the lower legs 30 of the upper second member 6. Both ends 22, 38 of the lower first member 4 are typically exposed and thus not enclosed by the upper second member 6. This arrangement still facilitates the upper second member 6 partially protecting the lower first member 4 from the elements and also facilitates with fastening of the lower first member 4 to the horizontal arm 16, or a bracket supported by the mailbox post 18, while still permitting sliding movement of the upper second member 6 relative to the lower first member 4. As a result this arrangement, the bottom surface 10 of the T-shaped cross sectional profile 12 of the lower first member 4 remains partially exposed or accessible. It is to be appreciated that in order to ensure the desired sliding movement between the upper second member 6 and the lower first member 4, there must be sufficient clearance, e.g., at least a few thousands of an inch or so, between the inwardly facing surface of the upper second member 6, which defines the T-shaped recess 26, and the outwardly facing surface of the T-shaped cross sectional profile 12 of the lower first member 4.

Preferably, one or more adjustable tensions screws or members 40 are provided for adjusting the amount of friction or resistance which is experienced when the operator slides the upper second member 6 relative to the lower first member 4. Each adjustable tension screw or member 40 is threaded into a mating threaded hole 42 (see FIG. 4) formed in a sidewall of the upper second member 6 while a leading end of the adjustable tension screw or member 40 is located adjacent one of the sidewalls of the lower first member 4. If the one or more adjustable tensions screws or members 40 are incrementally threaded or screwed toward the sidewall of the lower first member 4, this gradually increases the amount of friction or resistance which is experienced as the operator slides the upper second member 6 relative to the lower first member 4. On the other hand, if the one or more adjustable tensions screws or members 40 are incrementally threaded or screwed away from the lower first member 4, this gradually decreases the amount of friction or resistance which is experienced as the operator slides the upper second member 6 relative to the lower first member 4.

The top surface of the upper second member 6 is sized and shaped so as to be at least partially received within a mailbox cavity or recess 46 that is typically formed on the lower portion of a conventional mailbox 48. As shown in FIGS. 3 and 5, for example, the opposed sidewalls of the upper second member 6 are thicker than the central region of the upper second member 6 such that a recessed area 44 (see FIG. 5) is located between a portion of the two opposed side walls, although this is not necessary. These thicker sidewalls are designed to engage with and facilitate attachment of a conventional mailbox 48 to the upper second member 6 via one or more screws, bolts, nails, etc., for example.

As is typically in the mailbox art, a bottom perimeter of a conventional mailbox 48 has a plurality of spaced apart attachment openings 50, e.g., between 3 and 12 attachment openings 50, which are all shaped, sized, and located so as to permit passage of a respective mounting screw, bolt, nail, etc., 52 there through and facilitate secure attachment of the bottom perimeter of the conventional mailbox 48 to the opposed sidewalls—and possibly one or both end wall(s)—of the upper second member 6, as generally shown in FIGS. 1, 2 and 4. It is to be appreciated that the mailbox 48 must be fastened to the upper second member 6 so that the upper second member 6 is sufficiently spaced away from the lower first member 4 so as avoid obstructing, hindering and/or restricting sliding movement of the upper second member 6 relative to the lower first member 4.

As is conventional, the mailbox 48 typically has a hinged or pivotably door 54, for example, which provides access to an internal compartment 56, defined by the mailbox 48, to facilitate both delivery and retrieval of the mail or packages from the mailbox 48. It is to be appreciated that overall size, shape and appearance of the mailbox 48 can vary from application to application, without departing from the spirit and the scope of the present disclosure. As is conventional in the art, the mailbox 48 may also be equipped with a pivotable flag 57 to indicate, when in its raised position, that mail is available to be picked up by the mail carrier.

The bottom surface of the upper second member 6 typically has a longitudinal groove 58 which extends the entire length of the bottom surface and has a width of between about ⅛ to 2 inches or so, preferably about ⅜ of an inch or so, and a height of between about 1/16 to % inches or so, preferably about ⅛ of an inch or so. This longitudinal groove 58 is sized, shaped and located so as to permit the first stop member 20, formed on the top surface of the lower first member 4, to pass closely along and within the longitudinal groove 58, as the upper second member 6 slidably moves relative to the lower first member 4. The mating stop member 24 is typically located within this longitudinal groove 58 and the mounting location of the mating stop member 24 is typically located about 2 to 4 inches or so from first end 60 of the upper second member 6. The mating stop member 24 is installed within the longitudinal groove 58 so that when the first stop member 20 abuts against the mating stop member 24, a sufficient section or length of the T-shaped lower first member 4, e.g., about 3 inches or so, always remains captively located within the T-shaped recess 26 and thereby prevents over extension and/or complete withdrawal of the upper second member 6 from the lower first member 4.

Turning now to FIGS. 6-9, a second embodiment of the present invention will now be described. As this embodiment is very similar to the previously discussed embodiment, identical elements will be given identical reference numerals.

As with the previous embodiment, the mailbox mounting bracket 2, according to this embodiment, also comprises both a lower first member 4 and an upper second member 6. The lower first member 4 is generally a planar member which has generally flat top and bottom surfaces 8, 10. The lower first member 4 may be manufactured from wood, plastic, metal, etc. The lower first member 4 typically has either a planar profile or a T-shaped transverse cross sectional profile 12 (similar to FIG. 4). The lower first member 4 typically has a length of between about 12 to 24 inches or so preferably about 16 inches or so, a maximum width of between about 4 to 9 inches or so preferably about 5½ inches or so and a height of about ½ to 1½ inches or so preferably between about ¾ of an inch or so. One or more mounting holes 14 (typically a plurality of mounting holes 14, such as three space apart mounting holes 14) are formed in the lower first member 4. The one or more mounting holes 14 are utilized for attaching the lower first member 4 to a horizontal arm 16 of a mailbox post 18, in a conventional manner. As with the previous embodiment, the mounting holes (not shown in detail) are typically located and extend along a central axis of the lower first member 4 and are located so as to overlie and facilitate attachment of the lower first member 4 to a horizontal arm 16 of the mailbox post 18 (see FIG. 6). Alternatively, one or more of the mounting holes of the lower first member 4 may extend normal to the central axis of the lower first member 4 to facilitate attachment to a (metal) bracket (not shown) of the mailbox post 18 to secure the lower first member 4 thereto. A respective fastener 15 (see FIG. 9), such as a screw, nail or bolt, passes through a respective mounting hole to fasten the lower first member 4 to the horizontal arm 16 or bracket of the mailbox post 18.

A first stop member 20, e.g., such as a screw, for example, or some other abutment component or member, is secured to the top surface 8 of the lower first member 4, typically closely adjacent, e.g., ⅛ of an inch or so, from a second end 22 of lower first member 4. As discussed above, this first stop member 20, when it abuts against a mating stop member 24 provided on the upper second member 6, prevents further relative sliding movement between the upper second member 6 and the lower first member 4.

A lower portion of the upper second member 6 defines a T-shaped recess 26 which extends the entire length of the upper second member 6 and is sized and shaped so as to closely and intimately receive and accommodate the planar profile or the T-shaped cross sectional profile 12 of the lower first member 4 therein while, at the same time, still permitting the upper second member 6 to slide/move relative to the secured lower first member 4. The upper second member 6 may also be manufactured from wood, plastic, metal, etc.

As shown in FIGS. 6-9, a lower portion of both opposed side walls of the upper second member 6, which defines the T-shaped recess 26 along with the upper second member 6, comprises a mating pair of (metal, e.g., aluminum) right angle L-shaped members 28'. A first upper leg 62 of each L-shaped member 28 is secured to a sidewall of the upper second member 6 typically by at least pair of adjustable tensions screws or members 40 while a second lower leg 30 of each L-shaped member 28' face toward, but are spaced apart, from one another thereby defining an opening 32 to the mating T-shaped recess 26 which receives and accommodates a bottom portion of the lower first member 4. The pair of adjustable tensions screws or members 40 facilitate adjusting the amount of friction or resistance which is experienced when the operator slides the upper second member 6 relative to the lower first member 4.

Each adjustable tension screw or member 40 passes through a respective opening (not shown in detail), formed in the first upper leg 62 of each L-shaped member 28', and is threaded into a mating threaded hole (not labeled—see FIG. 8) formed in a sidewall of the upper second member 6. Each respective opening, formed in the first upper leg 62 of each L-shaped member 28', may be oval shaped to assist with adjusting the spacing of the second lower leg 30 of each L-shaped member 28' from the upper second member 6. If the one or more of the pair of adjustable tensions screws or members 40 are incrementally threaded or screwed further into the upper second member 6, this gradually biases the L-shaped members 28' toward one another and increases the amount of friction or resistance, e.g., provides decreased clearance for the lower first member 4, which is experienced as the operator slides the upper second member 6 relative to the lower first member 4. On the other hand, if the one or more of the pair of adjustable tensions screws or members 40 are incrementally threaded or screwed outward away from the upper second member 6, this gradually separates the L-shaped members 28' away from one another and decreases the amount of friction or resistance, e.g., provides greater clearance for the lower first member 4, which is experienced as the operator slides the upper second member 6 relative to the lower first member 4.

Typically, the bottom surface 32 of each one of the second lower legs 30 of the generally L-shaped members 28' are flush with or extend parallel to one another and may be flush or lower than the bottom surface 10 of the lower first member 4, e.g., the bottom surface 32 of each one of the second lower legs 30 and the bottom surface 10 of the lower first member 4 may all lie in a common plane with one another or the second lower legs 30 may be slightly lower than the bottom surface 10 of the lower first member 4, although this is not absolutely critical.

The upper second member 6 typically has a length of between about 12 to 24 inches or so preferably about 16 inches or so, a width of between about 4 to 9 inches or so preferably about 6¼ inches or so and a height of between about ⅝ to 3 inches or so and preferably about 2⅛ inches or so. The dimensions of a top widest section of the T-shaped recess 26 typically has a width of about 5½ inches or so and a height of about ½ of an inch or so while the dimensions of a bottom narrowest section of the T-shaped recess 26 typically has a width of about 3⅝ inches or so and a height of about ¹⁄₁₆ of an inch. The spacing of the free ends of the second lower legs 30 from the lower first member 4 is designed so as to accommodate the lower portion of the planar or T-shaped lower first member 4 therebetween with some play, e.g., about ¹⁄₁₆ to ¼ or so of play between the free ends of each of the second lower shorter legs and the T-shaped lower first member 4.

During assembly, the planar profile or the T-shaped cross sectional profile 12 of the lower first member 4 is captively received and enclosed within the T-shaped recess 26 of the upper second member 6 such that three sides of the lower first member 4 are completely surrounded by the upper second member 6 while the fourth side of the lower first member 4 is only partially surrounded by second lower legs 30 of the upper second member 6. Both opposed ends 22, 38 of the lower first member 4 are typically exposed and thus not enclosed by the upper second member 6. This arrangement still facilitates the upper second member 6 partially protecting the lower first member 4 from the elements and also facilitates fastening of the lower first member 4 to the horizontal arm 16 or a bracket of the mailbox post 18 while still permitting sliding movement of the upper second member 6 relative to the lower first member 4. As a result this arrangement, the bottom surface of the planar profile or the T-shaped cross sectional profile 12 of the lower first member 4 remains partially exposed or accessible. It is to be appreciated that in order to ensure the desired sliding movement between the upper second member 6 and the lower first member 4, there must be sufficient clearance, e.g., at least a few thousands of an inch or so, between the inwardly facing surface of the upper second member 6, which defines the T-shaped recess 26, and the outwardly facing surface of the planar profile or the T-shaped cross sectional profile 12 of the lower first member 4.

Figure 7:
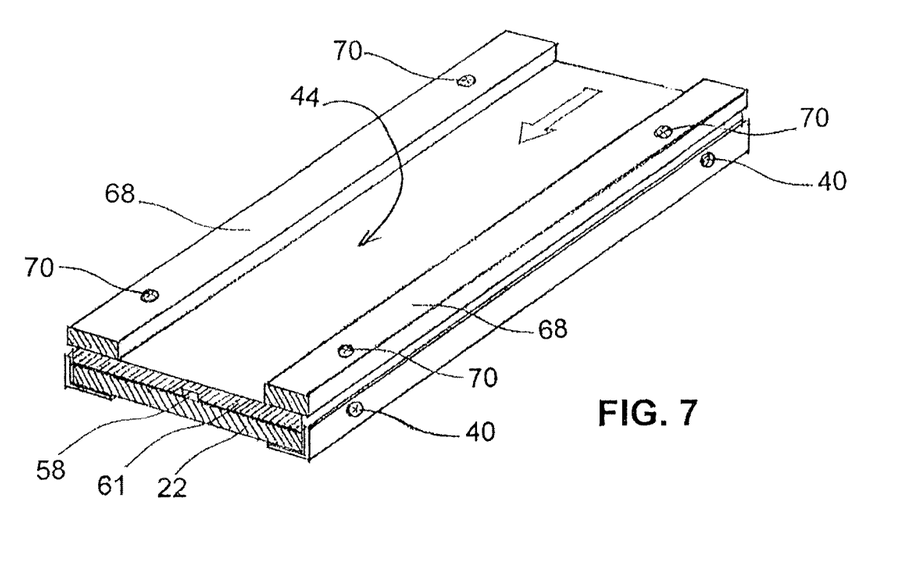
FIG. 7 is a diagrammatic perspective view showing the first and the second brackets of the mailbox mounting bracket of the second embodiment assembled with one another, prior to attachment of the mailbox to the upper second member, with the mailbox bracket shown in its normal stowed contracted position.
Figure 9:
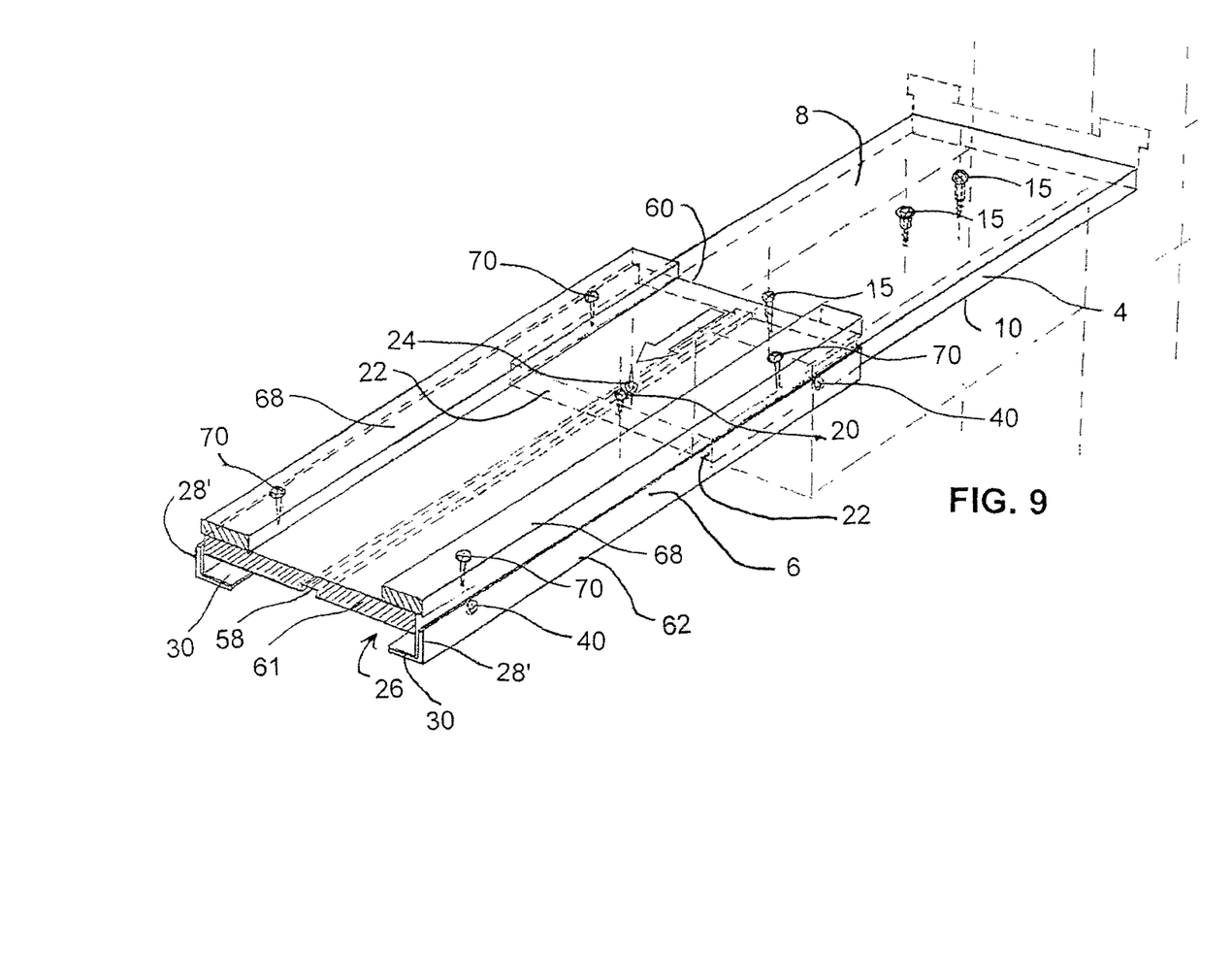
FIG. 9 is a diagrammatic perspective view showing the first and second brackets of the mailbox mounting bracket of the second embodiment assembled with one another, prior to attachment of the mailbox to the upper second member, with the mailbox bracket shown in its extended position which facilitates delivery and retrieval of mail.

The top surface of the upper second member 6 is sized and shaped so as to be at least partially received within a mailbox recess 46 that is typically formed on the lower portion of a conventional mailbox 48. As shown in FIGS. 7 and 9, for example, a pair of side rails 68 are secured to the top surface of the upper second member 6, e.g., by at least a set of attachment screws, nails, bolts, etc., 70 so that the two opposed sides are thicker than the central region of the upper second member 6, which carries the longitudinal groove 58 to facilitate mounting of the mailbox 48 thereto, such that a top recessed area 44 is located between the two opposed side rails 68, although this is not absolutely necessary. These side rails 68 are designed to engage with and facilitate attachment of a conventional mailbox 48 to the upper second member 6.

Figure 6:
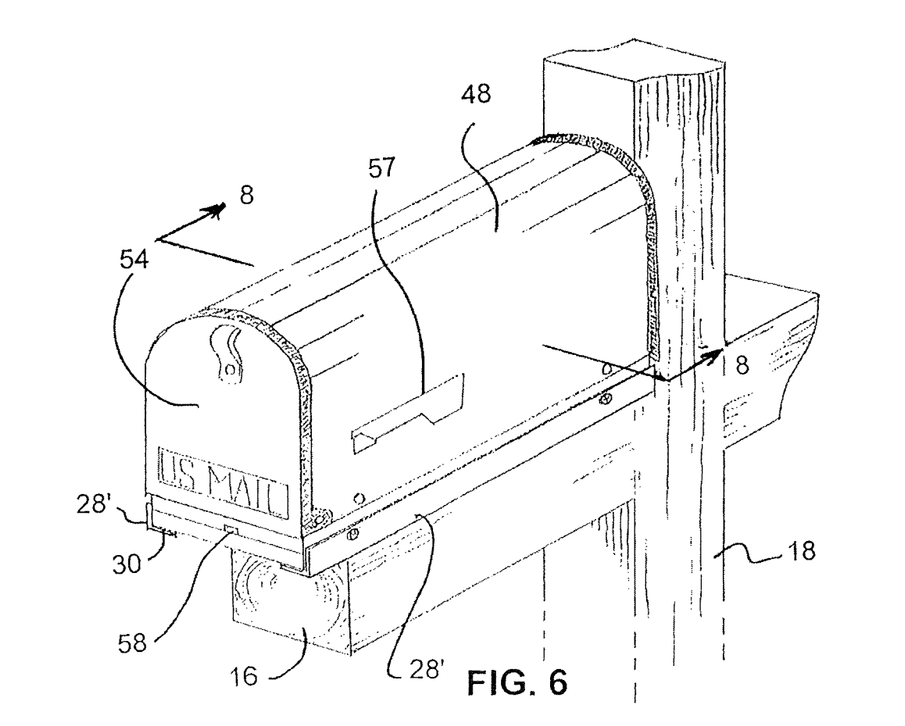
FIG. 6 is a diagrammatic perspective view showing use of a second embodiment of the mailbox mounting bracket, according to the disclosure, attached to a horizontal arm of a mailbox post and supporting a mailbox.
Figure 8:
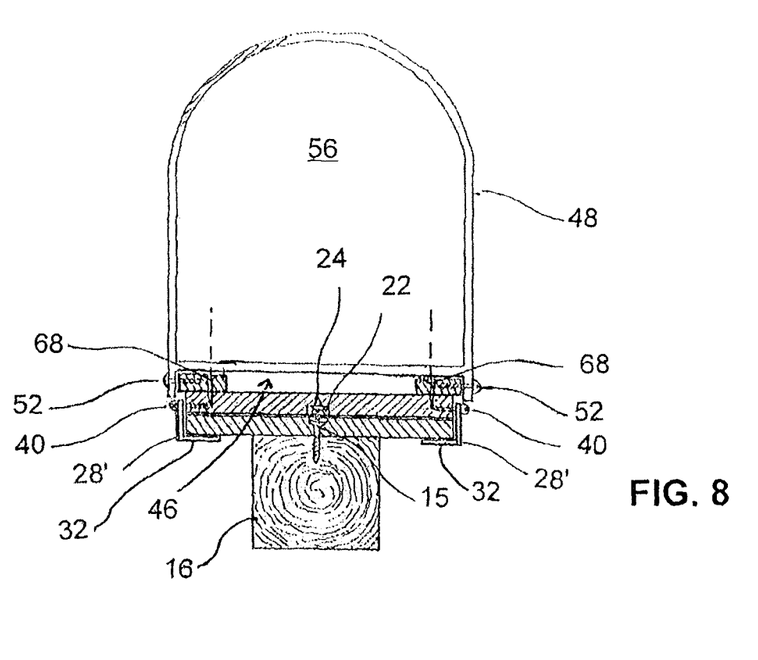
FIG. 8 is a diagrammatic cross sectional view showing the mailbox shown mounted to the mailbox mounting bracket along section line 8-8 of FIG. 6 after the lower first member is mounted to the horizontal arm of the mailbox post.

As is typically in the mailbox art, a bottom perimeter of a conventional mailbox 48 has a plurality of spaced apart attachment openings 50, e.g., between 3 and 12 attachment openings 50, which are all shaped, sized, and located so as to permit passage of a respective mounting screw, bolt, nail, etc., 52 there through and facilitate secure attachment of the bottom perimeter of the conventional mailbox 48 to one of the opposed side rails 68—and possibly one or both end wall(s) 60, 61—of the upper second member 6, as generally shown in FIGS. 6 and 8. It is to be appreciated that the mailbox 48 must be fastened to the upper second member 6 so that the upper second member 6 is sufficiently spaced away from the lower first member 4 so as avoid obstructing, hindering and/or restricting sliding movement of the upper second member 6 relative to the lower first member 4.

As is conventional, the mailbox 48 typically has a conventional hinged or pivotably door 54, for example, which provides access to an internal compartment 56, defined by the mailbox 48, to facilitate both delivery and retrieval of the mail or packages from the mailbox 48. It is to be appreciated that overall size, shape and appearance of the mailbox 48 can vary from application to application, without departing from the spirit and the scope of the present disclosure.

The bottom surface of the upper second member 6 typically has a longitudinal groove 58 which extends the entire length of the bottom surface and has a width of between about ⅛ to 2 inches or so, preferably about ⅜ of an inch or so, and a height of between about ¹⁄₁₆ to ½ inches or so, preferably about ⅛ of an inch or so. This longitudinal groove 58 is sized, shaped and located so as to permit the first stop member 20, formed on the top surface 8 of the lower first member 4, to pass closely along and within the longitudinal groove 58, as the upper second member 6 slidably moves relative to the lower first member 4. The mating stop member 24 is also typically located within this longitudinal groove 58 and the mounting location of the mating stop member 24 is typically located about 2 to 4 inches or so from first end of the longitudinal groove 58. The mating stop member 24 is located within the longitudinal groove 58 so that a sufficient section or length of the T-shaped lower first member 4, e.g., about 3 inches or so, always remains captively located within the T-shaped recess 26 when the first stop member 20 abuts against the mating stop member 24 and thereby prevents over extension and/or complete withdrawal of the upper second member 6 from the lower first member 4.

Figure 10:
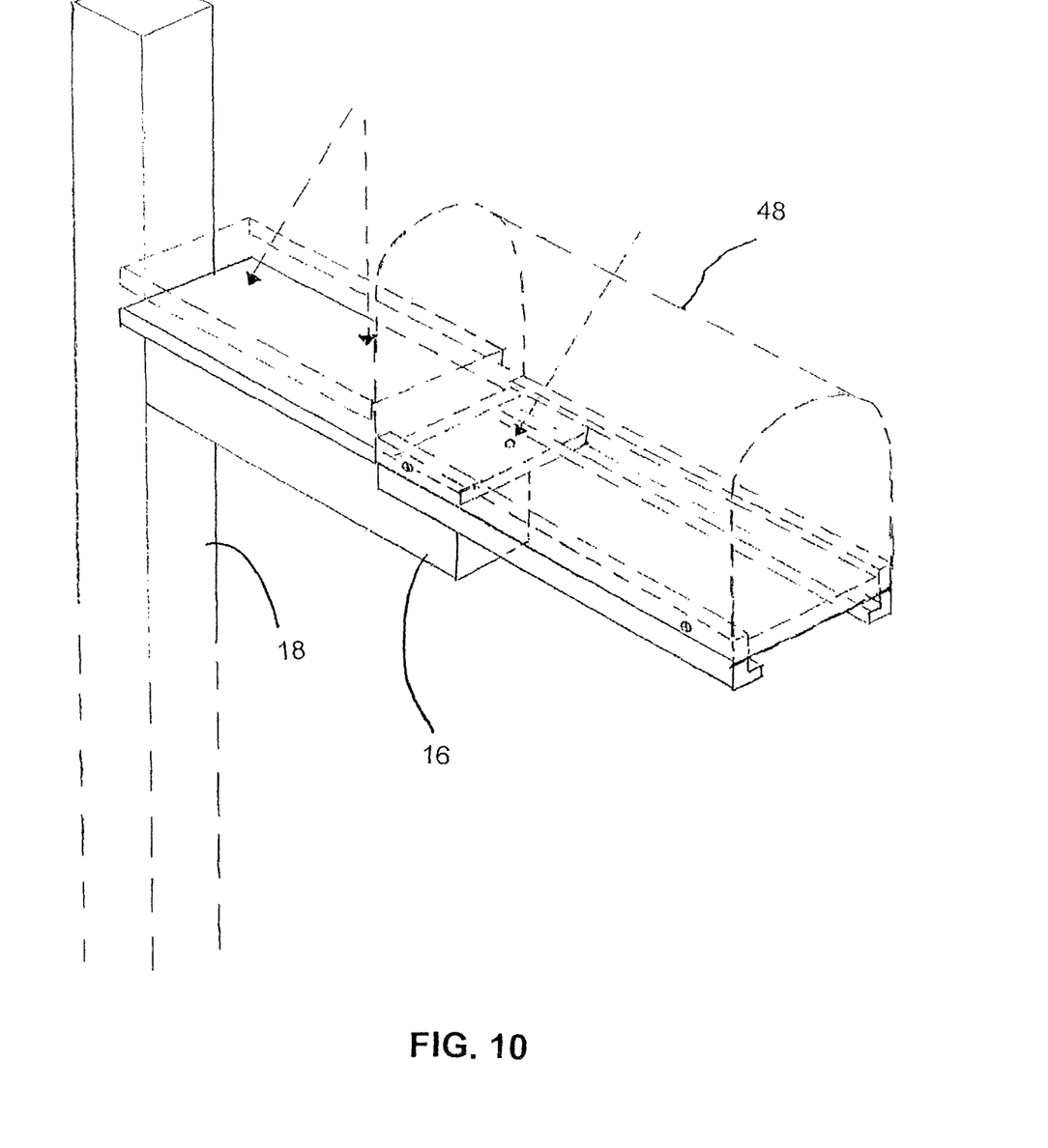
FIG. 10 shows extension nailers for use when installing an oversized mailbox.

FIG. 10 shows extension nailers for use in accommodating an oversized mailbox and mounting the same to the mailbox mounting bracket 2, according to the disclosure.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, we claim:

1. A mailbox mounting bracket for a mailbox, the mailbox mounting bracket comprising:
a lower first member;
an upper second member;
the lower first member having a T-shaped transverse cross sectional profile;
the upper second member defining a mating T-shaped recess;
the T-shaped recess of the upper second member captively receiving and enclosing the T-shaped transverse cross sectional profile of the lower first member such that three sides of the lower first member are completely surrounded by the upper second member while a fourth side of the lower first member is only partially surrounded by lower legs of the upper second member and is at least partially exposed so as to facilitate attachment of the lower first member to a surface of a mailbox post; and
the upper second member being slidably moveable relative to the lower first member;
wherein a plurality of mounting holes are located and extend along a central axis of the lower first member, and the plurality of mounting holes are located so as to overlie and facilitate attachment of the lower first member to the mailbox post.

2. The mailbox mounting bracket according to claim 1, wherein a first stop member is secured to the lower first member adjacent a second end thereof and a mating stop member is secured to the upper second member adjacent a first end thereof, and when the first stop member and the mating stop member abut against one another, further relative sliding movement, in one direction, between the upper second member and the lower first member is prevented.

3. The mailbox mounting bracket according to claim 2, wherein a bottom surface of the upper second member has a longitudinal groove which extends substantially along an entire length of the bottom surface and is sized and located so as to permit movement of the first stop member along the longitudinal groove.

4. The mailbox mounting bracket according to claim 3, wherein the mating stop member is secured within the longitudinal groove closely adjacent the first end of the upper second member.

5. The mailbox mounting bracket according to claim 4, wherein the longitudinal groove has a width of between ⅛ to 2 inches and a height of between 1/16 to ½ inches.

6. The mailbox mounting bracket according to claim 2, wherein the mating stop member is located to engage with the first stop member such that a sufficient length of the T-shaped lower first member remains captively located within the T-shaped recess and thereby prevents over extension or complete withdrawal of the upper second member from the lower first member.

7. The mailbox mounting bracket according to claim 1, wherein the lower first member has a length of between 12 to 24 inches, a width of between 4 to 9 inches and a height of between ½ to 1½ inches, and the upper second member has a length of between 12 to 24 inches, a width of between 4 to 9 inches and a height of between ½ to 3 inches.

8. The mailbox mounting bracket according to claim 1, wherein a widest section of the T-shaped recess has a width of about 5½ inches and a height of about ½ of an inch while a narrowest section of the T-shaped recess has a width of about 3⅝ inches and a height of about 1/16 of an inch.

9. The mailbox mounting bracket according to claim 1, wherein one or more adjustable tension members are provided for adjusting an amount of friction or resistance which is experienced by an operator when the operator slides the upper second member relative to the lower first member.

10. A mailbox mounting bracket for a mailbox, the mailbox mounting bracket comprising:
a lower first member;
an upper second member;
the lower first member having a T-shaped transverse cross sectional profile;
the upper second member defining a mating T-shaped recess;
the T-shaped recess of the upper second member captively receiving and enclosing the T-shaped transverse cross sectional profile of the lower first member such that three sides of the lower first member are completely surrounded by the upper second member while a fourth side of the lower first member is only partially surrounded by lower legs of the upper second member and is at least partially exposed so as to facilitate attachment of the lower first member to a surface of a mailbox post; and
the upper second member being slidably moveable relative to the lower first member;
wherein a top surface of the upper second member is sized and shaped so as to be at least partially received within a mailbox recess formed in a lower portion of the mailbox, and a portion of the top surface of the upper second member facilitate attachment of the lower portion of the mailbox to the upper second member, via a plurality of spaced apart attachment openings formed in a bottom perimeter of the mailbox.

11. The mailbox mounting bracket according to claim 1, wherein a pair of adjustable L-shaped members are respectively attached to opposed side walls of the upper second member, by adjustable tension members, and the adjustable L-shaped members and the upper second member together define the T-shaped recess.

12. The mailbox mounting bracket according to claim 11, wherein the adjustable tension members facilitate adjusting an amount of friction or resistance which is experienced as the upper second member slides relative to the lower first member.

13. The mailbox mounting bracket according to claim 12, wherein when one or more of the adjustable tension members is incrementally threaded or screwed further into the upper second member, this gradually biases the L-shaped members toward one another and increases the amount of friction or resistance which is experienced as the upper second member slides relative to the lower first member, and, when one or more of the adjustable tension members is incrementally threaded or screwed further away from the upper second member, this gradually separates the L-shaped members from one another and decreases the amount of friction or resistance which is experienced as the upper second member slides relative to the lower first member.

14. The mailbox mounting bracket according to claim 11, wherein a bottom surface of each one lower leg of the L-shaped members are flush with or extend parallel to one another as well as a bottom surface of the lower first member.

15. The mailbox mounting bracket according to claim 1, wherein a pair of side rails are secured to a top surface of the upper second member such that the two opposed longitudinal sides of the upper second member are thicker, and the side rails are designed to engage with and facilitate attachment of the mailbox to the upper second member.

16. The mailbox mounting bracket according to claim 1, wherein the mailbox has a hinged or pivotably door which provides access to an internal compartment defined by the mailbox, and the door facilitates both delivery and retrieval of the mail or packages from the mailbox.

17. The mailbox mounting bracket according to claim 1, wherein the mailbox mounting bracket comprises the lower first member, the upper second member, two L-shaped members and two side rails which are all assembled with one another to form the mailbox mounting bracket.

18. A method of attaching a mailbox to a mailbox post by using a mailbox mounting bracket, the method comprising:
   providing a lower first member;
   providing an upper second member;
   shaping the lower first member to have a T-shaped transverse cross sectional profile;
   defining a mating T-shaped recess in the upper second member;
   captively receiving and enclosing the T-shaped transverse cross sectional profile of the lowerfirst member in the T-shaped recess of the upper second member such that three sides of the lowerfirst member are completely surrounded by the upper second member while a fourth side of the lower first member is only partially surrounded by lower legs of the upper second member and is at least partially exposed so as to facilitate attachment of the lower first member to a surface of the mailbox post; and
   providing sufficient clearance such that the upper second member being slidably moveable relative to the lower first member;
   wherein a plurality of mounting holes are located and extend along a central axis of the lower first member, and the plurality of mounting holes are located so as to overlie and facilitate attachment of the lower first member to the mailbox post.

* * * * *